United States Patent
Watt

[11] Patent Number: 5,964,243
[45] Date of Patent: Oct. 12, 1999

[54] TANK DRAIN VALVE WITH A ROD CONCENTRIC WITH VALVE MEMBER TO PIERCE SEDIMENTARY LAYER IN TANK

[76] Inventor: Donald Peter Watt, 29 Harris Road, Busselton, Western Australia, 6280, Australia

[21] Appl. No.: 08/930,310

[22] PCT Filed: Apr. 11, 1996

[86] PCT No.: PCT/AU96/00211

§ 371 Date: Oct. 10, 1997

§ 102(e) Date: Oct. 10, 1997

[87] PCT Pub. No.: WO96/32603

PCT Pub. Date: Oct. 17, 1996

[30] Foreign Application Priority Data

Apr. 11, 1995 [AU] Australia ................................. PN2359
Dec. 11, 1995 [AU] Australia ................................. PN7083

[51] Int. Cl.⁶ ............................. B08B 9/04; F16K 51/00
[52] U.S. Cl. ................ 137/244; 15/140.061; 15/104.16; 251/63
[58] Field of Search ................... 137/244, 245.5; 251/62, 63; 15/104.061, 104.16, 104.11, 104.03, 104.05

[56] References Cited

U.S. PATENT DOCUMENTS

| 232,724 | 9/1880 | Jenkins | 137/245.5 |
|---|---|---|---|
| 743,702 | 11/1903 | Fink, Jr. | 137/245.5 |
| 751,538 | 2/1904 | Murdock | 137/245.5 |
| 837,035 | 11/1906 | Butler | 137/245.5 |
| 1,069,013 | 7/1913 | Hinckley | 137/245.5 |
| 1,467,492 | 9/1923 | Olson | 137/245.5 |
| 2,530,433 | 11/1950 | Jaegle | 137/244 |
| 3,065,949 | 11/1962 | Frees | 251/62 |
| 3,211,422 | 10/1965 | Brown | 251/324 |
| 3,949,963 | 4/1976 | Aoki | 251/63.6 |
| 4,160,117 | 7/1979 | Schempp | 432/64 |
| 4,192,342 | 3/1980 | Adams | 137/245.5 |
| 4,391,289 | 7/1983 | Adams | 137/15 |
| 4,408,627 | 10/1983 | Harris | 137/244 |
| 4,460,025 | 7/1984 | Scholle et al. | 137/244 |
| 4,836,236 | 6/1989 | Ladisch | 137/241 |
| 4,858,641 | 8/1989 | Titus | 137/244 |
| 5,673,897 | 10/1997 | Crochet et al. | 137/244 |

FOREIGN PATENT DOCUMENTS

B80193/75 4/1975 Australia .
A-73029/94 4/1995 Australia .

OTHER PUBLICATIONS

The Original Ram Type Drain Valve, 6 pages (no date).

*Primary Examiner*—George L. Walton
*Attorney, Agent, or Firm*—McCormick, Paulding & Huber

[57] ABSTRACT

A valve comprising a body adapted to be associated with an opening in the wall of a fluid reservoir or flowline, to provide a flow path, from an inlet (111) at the opening, to an outlet (114), a valve seat (117) located across the flow path at the inlet (111), a valve member (116) movably supported from the body to be movable between a closed position at which it is in sealing engagement with the valve seat (117) and an open position at which it is spaced from the valve seat (117), an elongate clearing element (128) which is slidably supported from the valve member (116), said clearing member (128) having an outer end (129) which is movable towards and away from the valve member (116) between an extended position at which it extends from the valve member (116) through the valve seat (117) beyond the opening and a retracted position closely adjacent the valve (116) member, a drive means (120) to cause movement of the valve member (116) between the open and closed positions and to cause movement of the clearing member (128) between the extended and retracted positions.

6 Claims, 8 Drawing Sheets

TANK DRAIN VALVE WITH A ROD CONCENTRIC WITH VALVE MEMBER TO PIERCE SEDIMENTARY LAYER IN TANK

This invention relates to a valve and in particular it relates to a valve which is to be used in installations where there is a likelihood of sedimentation or scaling in the region of the flow path which is to be controlled by the valve.

The valve has a particular application to installations where liquors are stored in vats or reservoirs which are associated with a drain provided with a valve. In many cases, while the liquor is maintained at a particular condition such as above a predetermined temperature, at which there is usually no precipitation or sedimentation. However, sedimentation can occur at critical times and when the conditions such as temperature vary and this can be particularly prevalent in the region of a drain which is generally associated with a well formed in the wall of the vat or reservoir. As a result of the well the liquor contained in the well is subject to cooling and often is stagnant. As a result precipitation or sedimentation will occur in the region of the drain, and it is often the situation that when the drain valve is opened, the build up of deposits in the region of the drain aperture can result in a blockage which prevents an adequate flow of liquor from the drain. It then becomes necessary to attempt to clear the aperture from the surface of the liquor or through the open valve by some external tool or the like. Such an arrangement is not only difficult but can be extremely hazardous to the personnel and can result in damage to the vat, and drain.

Some arrangements have been proposed in the past to provide means in association with valves which can be used to clear a fluid pathway upstream from a valve in order to ensure a flow of fluid on the valve being opened. Examples of these arrangements are disclosed in U.S. Pat. No. 1,467,492, U.S. Pat. No. 2,530,433, U.S. Pat. No. 3,211,422, U.S. Pat. No. 4,391,289 and U.S. Pat. No. 4,192,342. A difficulty with many of these prior art devices however is the dependent nature of the clearing action with the movement of the valve member towards and away from the valve seat. In addition it is necessary to ensure that once the valve is opened that sufficient clearance exists for any particles of solid material that have been created prior to the opening of the valve by the clearing action and/or which are in the region of the opening prior to opening will be able to pass through the opened valve without obstructing the flow through the valve. It is also desirable that the clearing means be able to move past the valve seat and into the volume associated with the valve in order to be able to penetrate any layer of sediment that has built up over the outlet and to provide an opening through the layer of sediment or scale.

It is an object of this invention to provide a valve which can be utilised in circumstances where sedimentation or scaling can occur which can otherwise limit an adequate fluid flow through the valve, when open.

Accordingly, the invention resides in a valve comprising a body adapted to be associated with an opening in the wall of a fluid reservoir or flowline, to provide a flow path, from an inlet at said opening, to an outlet, a valve seat located across the flow path at the inlet, a valve member movably supported from the body to be movable between a closed position at which it is sealing engagement with the valve seat and an open position at which it is spaced from the valve seat, an elongate clearing element which is slidably supported from the valve member, said clearing member having an outer end which is movable towards and away from the valve member between an extended position at which it extends from the valve member through the valve seat beyond the opening and a retracted position closely adjacent the valve member, a drive means to cause movement of the valve member between the open and closed positions and to cause movement of the clearing member between the extended and retracted positions.

According to a preferred feature of the invention the clearing element is movable with the valve member on movement of the valve member between the closed and open positions. It is a further preferred feature that the clearing member is also movable independently of the valve member between its extended position and its retracted position when the valve member is at least at both its closed and open positions.

According to a further preferred feature the clearing element is supported from the valve member to be rotatable about its central axis. In this regard it is a further feature of the invention that the clearing element can be caused to rotate about its central axis during its movement between the extended and retracted position.

According to a further preferred feature of the invention the outer end of the clearing element is provided with a wear resistant cutting element. In a preferred form the outer end of the clearing element has a diameter substantially corresponding to the diameter of the valve seat.

According to a further preferred feature of the invention the drive means comprises a fluid operated member associated with the valve member and the clearing member. If desired a separate fluid operated member can be associated with the valve member and the clearing element.

According to one particular embodiment of the invention the valve member is of an elongate configuration and is movable axially into and out of engagement with the valve seat. A further feature of the embodiment the valve member Is cylindrical in shape. It is a further feature that the valve member is provided with a first seal at one end which is proximate the valve seat wherein the first seal is in engagement with the valve seat when the valve member is at its closed to sealingly close the valve. According to a further preferred feature of the embodiment the drive means includes said valve member being provided with a second seal at a position spaced from the one end, said second seal being received in a cylindrical first chamber which is concentric to the valve member, said second seal defining two sub-chambers within the chamber and said sub-chambers being capable of being pressurised to effect said movement of the valve member.

In one form of the above embodiment the second seal is located at the other end of the valve member. It is a further feature of the embodiment that the inner portion of the clearing element is provided with a third seal which is received in the one sub-chamber remote from the opening and which subdivides the one sub-chamber into two further sub-chambers said further sub-chambers being capable of being pressurised to effect said movement of the clearing element.

According to an alternative form of the embodiment the second seal is located intermediate of the length of the valve member. According to this form the other end of the valve member extends beyond the chamber. In addition the valve member is hollow and a second chamber is defined within the valve member around the portion of the clearing element received therein and wherein the portion of the clearing element is provided with a third seal which is received in the second chamber to subdivide the second chamber into two further sub-chambers said further sub-chambers being capable of being pressurised to effect said movement of the clearing element.

According to a further preferred feature of the invention a locking means is provided between the valve member and the body to selectively lock the valve member in position.

According to a further preferred feature of the invention a substantially unobstructed flow path is provided in the body between the inlet and the outlet when the valve member is in the open position and the clearing member is in the retracted position. According to an embodiment of the invention this is achieved by providing that the cross sectional dimensions of the flow path are at least equal to the cross sectional dimensions of the valve seat.

The invention will be more fully understood in the light of the following description of several specific embodiments. The description is made with reference to the accompanying drawing of which:

Figure 1:
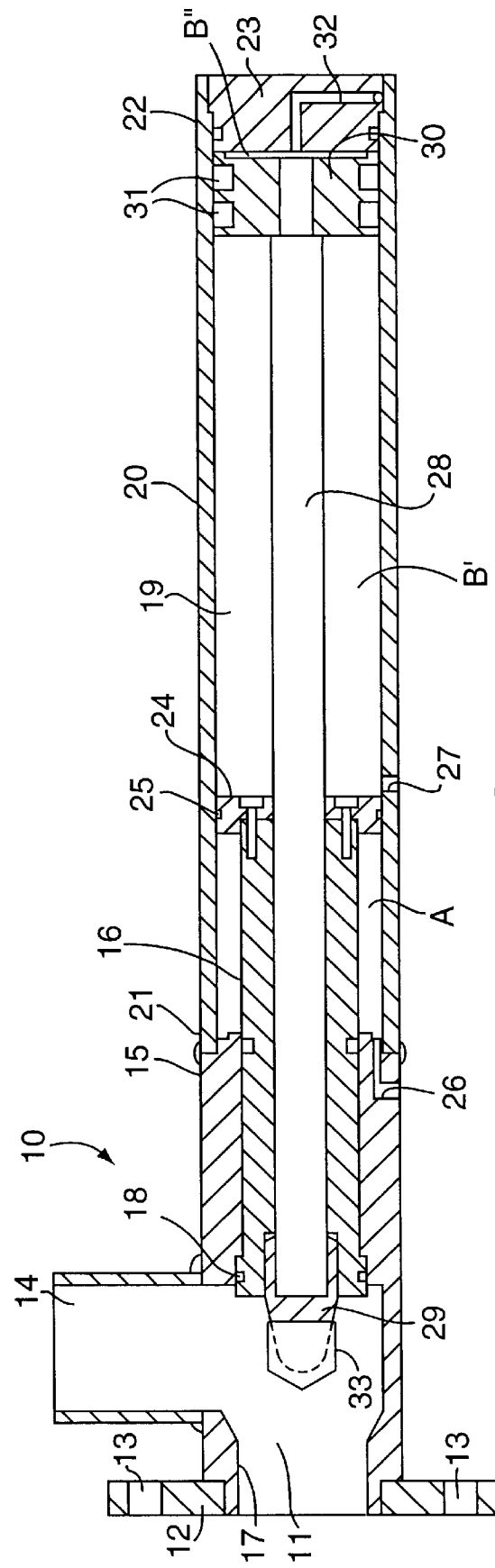
FIG. 1 is a sectional side elevation of a valve according to the first embodiment with the valve member in the open position and the clearing element in the retracted position.

The valve of the first embodiment as shown at FIGS. 1, 2, 3 and 4 comprises a hollow body 10 which defines a passage having an inlet 11 and an outlet 14 which are of uniform cross section and are offset from each other by 90 degrees. The inlet is provided at its outer end with a flange 12 which is engagable with the wall (not shown) of a vat to surround a drain hole (not shown) provided in the wall. The flange 12 is provided with a set of holes 13 which are receivable over studs provided in the wall of the vat.

The portion of the inlet 11 of the body 10 is provided with a valve seat which is engagable by a valve member 16 supported from a tubular extension 15 of the inlet portion of the hollow body. The valve member 16 is cylindrical and is provided with a suitable O-ring seal 18 at its inner end which engages with the valve seat 17 to close the valve, on movement of the valve member 16 such that its inner end is received within the valve seat 17 (see FIGS. 3 and 4).

The tubular extension 15 of the body is associated with a hydraulic cylinder having a chamber 19 which is defined by an outer cylindrical housing 20 fixed at one end 21 to the free end of the tubular extension 15 and which is closed at its other end 22 by an end cap 23. The outer end of the valve member 16 is received within the chamber 19 and is provided with a piston element 24 which is provided with an O-ring seal 25 and which sealingly subdivides the chamber 19 into a first portion A between the tubular extension 15 and the piston 24 and a second portion B between the end cap 23 and the first piston 24. A first port 26 is provided in the wall of the body 10 to provide communication into the first space A while a second port 27 is provided in the wall of the cylindrical housing 20 to provide communication with the second space B.

The valve member 16 slidably accommodates a clearing element which comprises a rod 28 which is concentrically sealingly and slidably supported within the valve member 16 to be capable of axial movement within the valve member, One end of the rod which is received in the inlet 11 of the hollow body 10 and is provided with a cap member 29 while the other end of the rod 28 is located within the second portion B of the chamber 19 and is provided with a second piston 30 which is provided with a pair of O-ring seals 31 and which sealingly engages with the internal wall of the cylindrical body 20 to subdivide the second space B within the chamber into the portion B' between the first piston 24 and the second piston 30 and a third space B" between the end cap 23 and the second piston 30. The end cap 23 is provided with a third port 32 which provides communication with the third space B".

Figure 2:
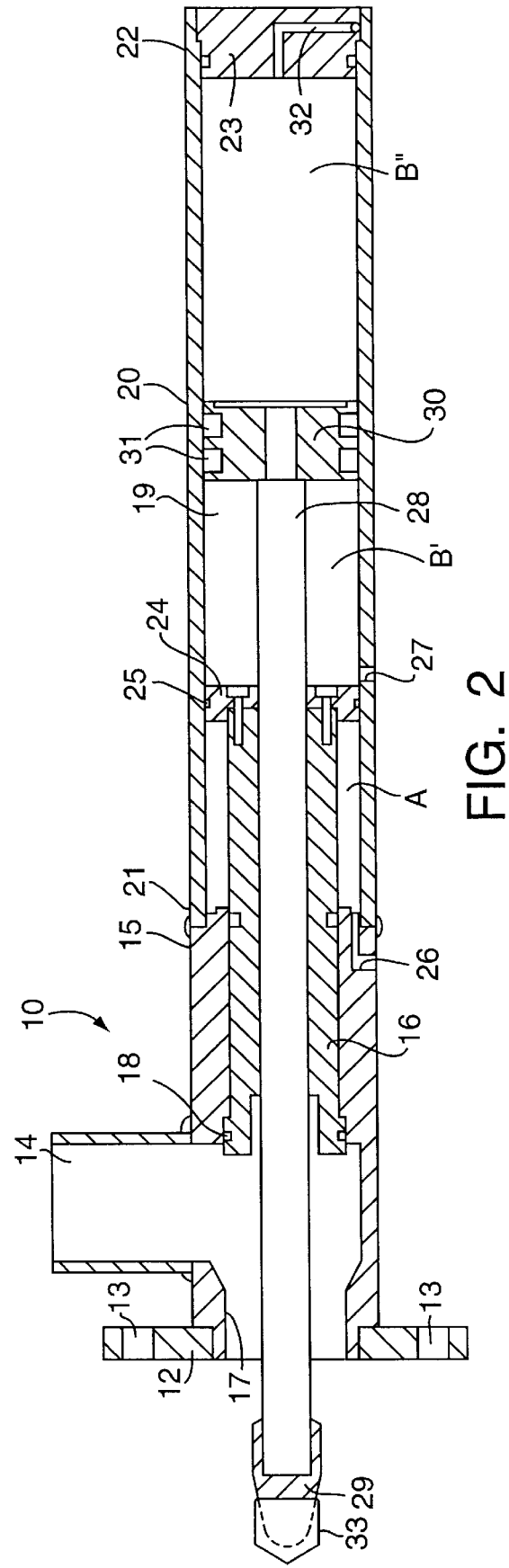
FIG. 2 is a sectional side elevation of a valve according to the first embodiment with the valve member in the open position and the clearing element in the partially extended position.
Figure 3:
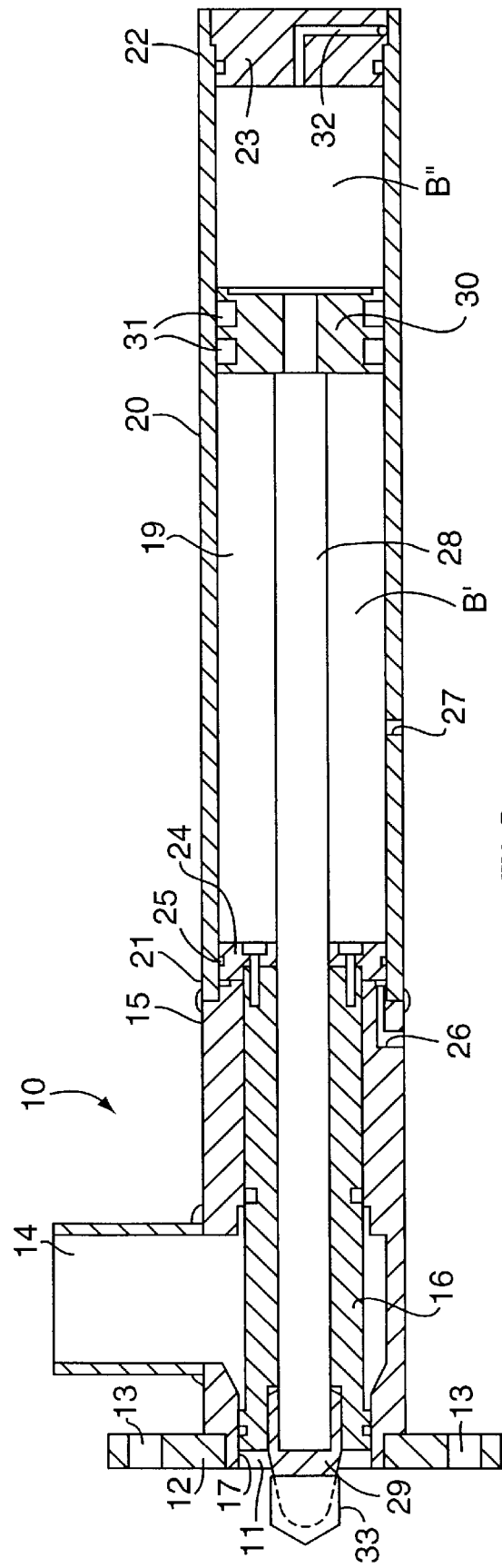
FIG. 3 is a sectional side elevation of a valve according to the first embodiment with the valve member in the closed position and the clearing element in the retracted position.
Figure 4:
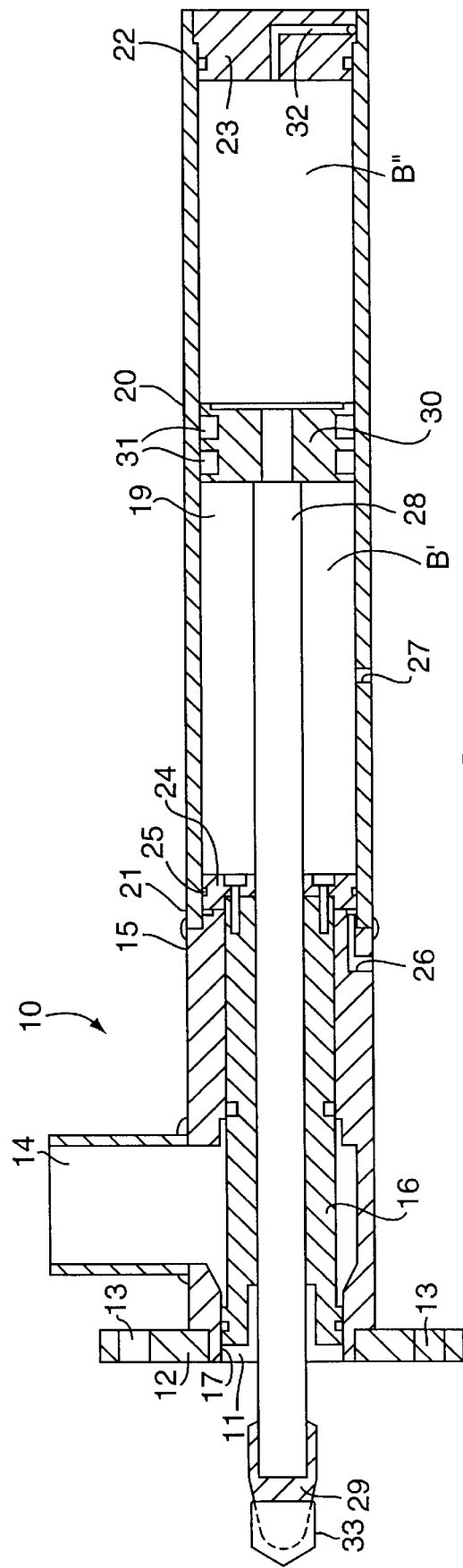
FIG. 4 is a sectional side elevation of a valve according to the first embodiment with the valve member in the closed position and the clearing element in the partially extended position.

The valve according to the first embodiment is intended to be utilised in association with the drain of a vat or a like storage vessel and which is intended to be in the normally closed position (see FIGS. 3 and 4) at which position the seal 18 of the valve member 16 is sealingly received in the valve seat 17. Where the liquor which is accommodated within the vat may be subject to sedimentation or scaling, there is a very strong likelihood that the zone above the drain outlet may be covered by sediment or scale. Therefore if the valve is opened whereby the seal 18 of the valve member 16 is withdrawn from engagement with the valve seat 17, to the retracted position as shown in FIGS. 1 and 2, there will be a restricted flow or no fluid flow from the drain outlet. In order to provide a full flow from the opened valve, the clearing element is moved axially from a retracted position at which the cap member 29 is accommodated within the inner end of the valve member 16 to an extended position at which it extends into the volume of the vat (as shown at FIG. 4) to penetrate the layer of scale or sediment which has collected within the region of the drain hole in order to clear such scale or sediment away from the drain hole prior to opening of the valve. The clearing element may then be withdrawn into engagement with the inner end of the valve member 16 (as shown at FIG. 3) and then the valve member 16 can be withdrawn from engagement with the valve seat 17 As shown at FIG. 1).

The movement of the clearing element between its retracted position and its extended position, and of the valve member 16 between its sealing engagement with the valve seat and its retracted position as shown in the drawing can be effected by application of fluid pressure to the respective spaces A, B' and B"" within the chamber 19 provided in the hydraulic cylinder. If desired the movement of the clearing element between the retracted position and the extended position may be effected when the valve member 16 is in its retracted position by application of pressure into the third space B" and venting of the second space B' and maintaining pressure in the third space A.

The cap member 29 on the one end of the clearing element is provided at its outer end with a cutting tip 33 which is formed of a wear resistant material and which is configured to enhance penetration of any deposit collecting in the region of the drain hole.

The valve of the first embodiment provides a means of ensuring that the region upstream of the valve is clear prior to the valve being opened and of ensuring that the region upstream of the valve remains clear during the period that the valve is open. In addition the valve member when retracted away from the valve seat ensures a clear passageway between the inlet 11 and the outlet 14 and as a result any detritus or pieces of sediment which are dislodged as a result of the action of the cutting tip will pass through the hollow body without causing an obstruction. Furthermore the configuration of the valve member is that it is substantially cylindrical and as a result when it is intermediate of the retracted and extended position it is not possible for detritus or pieces of sediment that are dislodged by the action of the cutting tip to become jammed between the wall of the hollow body and the valve member and which will prevent the full opening of the valve.

If desired the valve may be associated with a control means which will periodically activate the delivery of fluid to the second and third spaces B' and B" respectively to cause the clearing element to be cyclically moved from the retracted position to the extended position and then to the retracted position to maintain the region above the valve member and drain clear of sediment. This cyclic action may be effected manually or automatically.

The valve of the second embodiment as shown at FIGS. 5, 6, 7 and 8 comprises a hollow body 110 which defines a passage having an inlet 111 and an outlet 114 which are of uniform cross section and are offset from each other by 90 degrees. The inlet 111 is provided at its outer end with a flange 112 which is engagable with the wall (not shown) of a vat to surround a drain hole (not shown) provided in the wall. The flange 112 is provided with a set of holes 113 which are receivable over studs provided in the wall of the vat.

The inlet 111 of the body is provided with a valve seat 117 which is engagable by a valve member 116 supported from a tubular extension 115 of the inlet portion of the hollow body. The valve member 16 is cylindrical, hollow and is provided with a suitable O-ring seal 118 at its inner end which engages with the valve seat 117 to close the valve, on movement of the valve member 116 such that its inner end is received within the valve seat 117 (see FIGS. 7 and 8).

The tubular extension 115 of the body is associated with a hydraulic cylinder having a chamber 119 which is defined by an outer cylindrical housing 120 fixed at one end to the free end of the tubular extension 115 and which is closed at its other end by an annular end cap 123. The valve member 116 is received slidably and sealingly received within tubular extension 115 and the end cap 123 such that it is received through the chamber 119 and is provided with a piston element 124 which is provided with an O-ring seal 125 which sealingly subdivides the chamber 119 into a first space 141 between the tubular extension 115 and the piston 124 and a second space 142 between the end cap 123 and the first piston 124. A first port 126 is provided in the wall of the tubular extension 115 to provide communication into the first space 141 while a second port 127 is provided in the side of the end cap 123 to provide communication with the second space 142.

The valve member 116 slidably accommodates a clearing element which comprises a rod 128 which is concentrically sealingly and slidably supported within the valve member 116 to be capable of axial movement within the valve member. One end of the rod 128 is received in the inlet 111 of the hollow body and is provided with a cap member 129 while the other end of the rod 128 is slidably received in a second end cap 144 mounted at the other end of the valve member 116. The intermediate portion of the rod member 128 which is located within the hollow valve member 116 is provided with a second piston 130 which is provided with suitable seals 131 which sealingly engage with the internal wall of the hollow valve member 116 to provide a second pair of sub-chambers comprising a third space 146 which is innermost and a fourth space 147 which is outermost within the valve member 116. The second end cap 144 which closes the outer end of the valve member 116 is provided with a third port 149 which communicates with the innermost third space 146 through a passageway 150 formed axially through the wall of the valve member and an opening 151 which extends between the passageway 150 and the third space 146. The second end cap 144 is also provided with a fourth port 132 which provides communication into the outermost fourth space 147.

Figure 5:
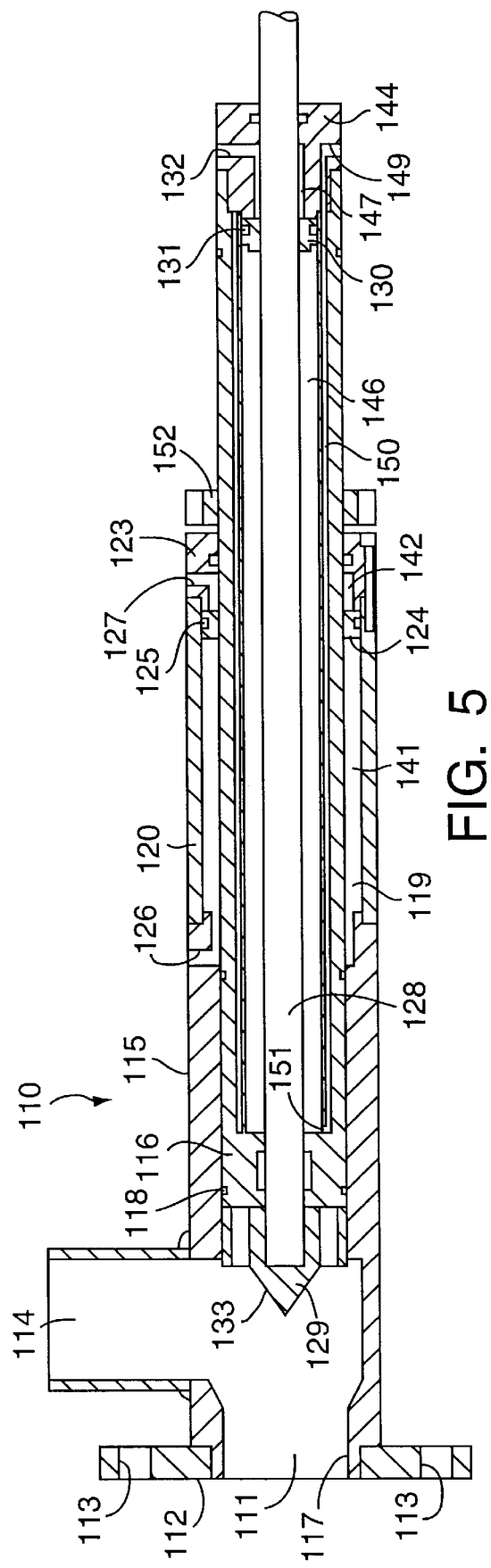
FIG. 5 is a sectional side elevation of a valve according to the second embodiment with the valve member in the open position and the clearing element in the retracted position.
Figure 6:
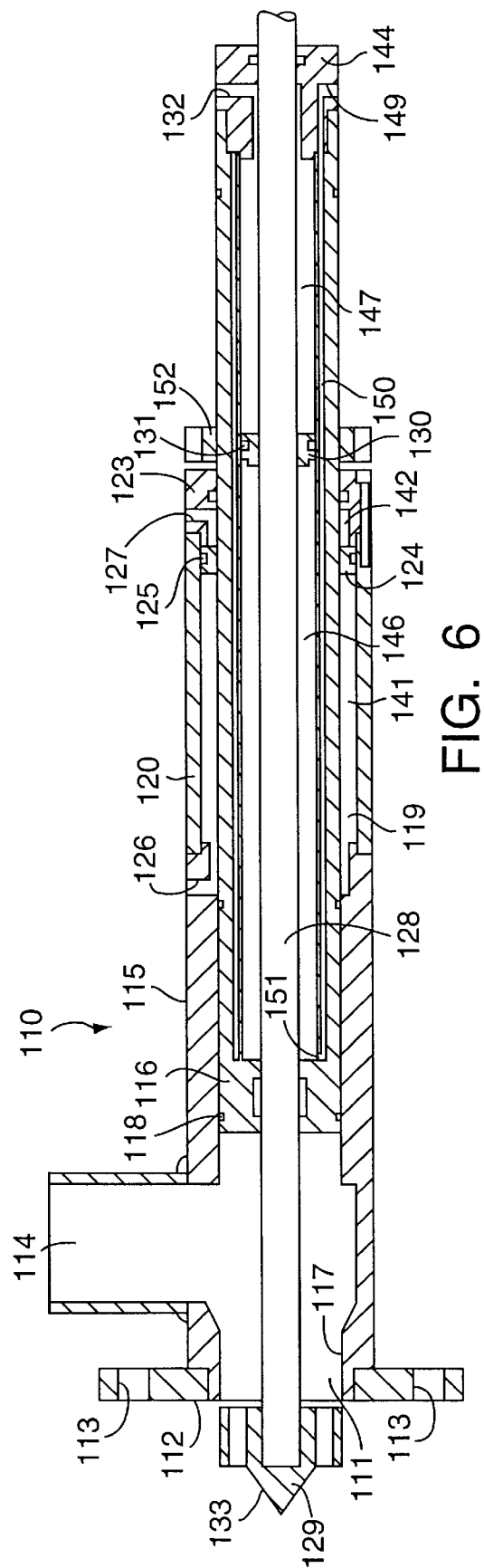
FIG. 6 is a sectional side elevation of a valve according to the second embodiment with the valve member in the open position and the clearing element in the partially extended position.
Figure 7:
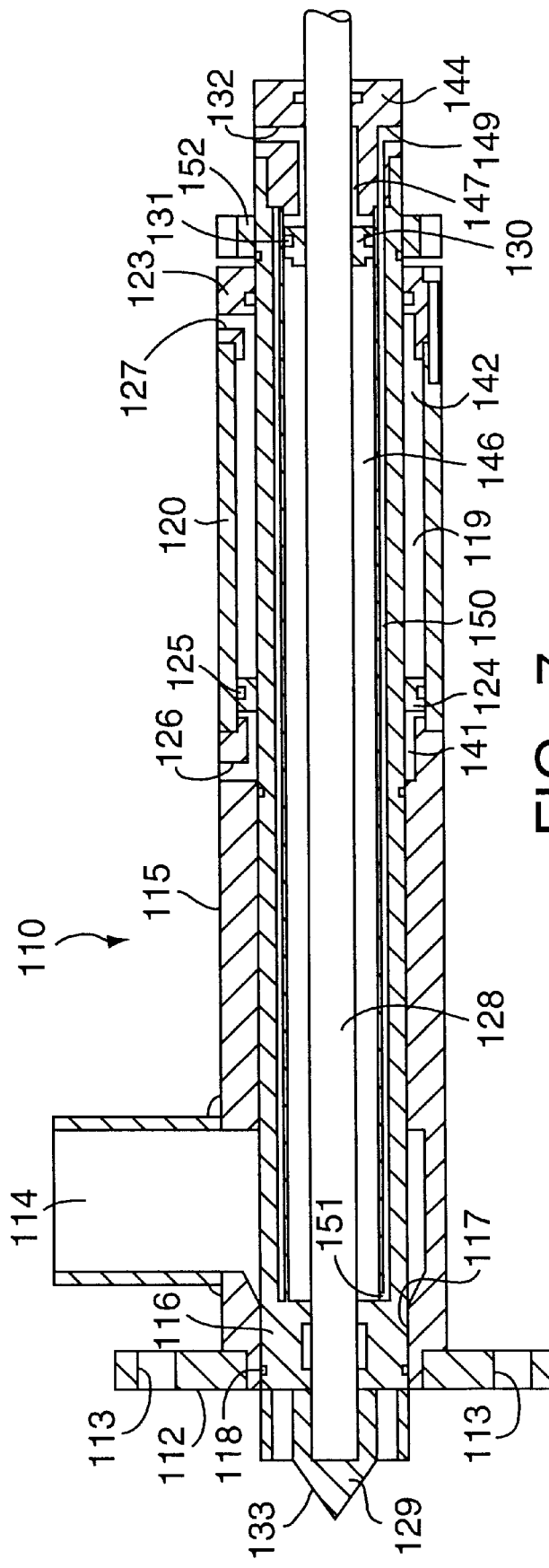
FIG. 7 is a sectional side elevation of a valve according to the second embodiment with the valve member in the closed position and the clearing element in the retracted position.
Figure 8:
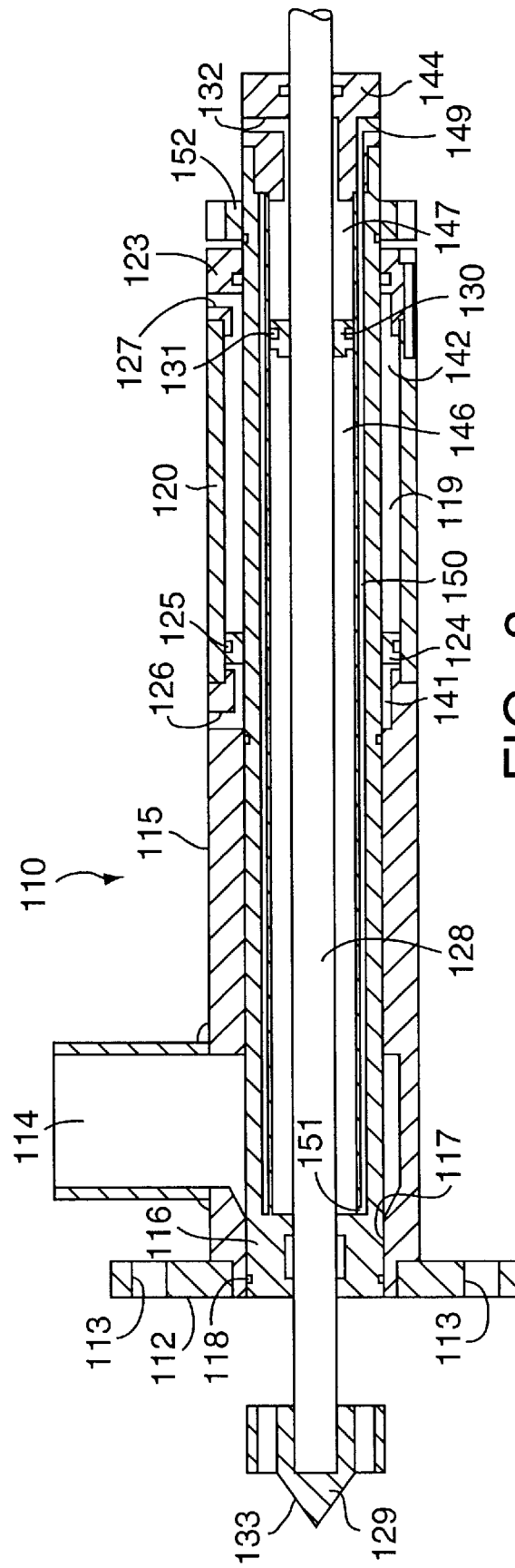
FIG. 8 is a sectional side elevation of a valve according to the second embodiment with the valve member in the closed position and the clearing element in the partially extended position.

The valve according to the second embodiment is intended to be utilised in association with the drain of a vat or a like storage vessel and which is intended to be in the normally closed position (see FIGS. 7 and 8) at which position the seal 118 of the valve member 116 is sealingly received in the valve seat 117. Where the liquor which is accommodated within the vat may be subject to precipitation, or sedimentation which is likely to cause scaling, there is a very strong likelihood that the zone above the drain outlet may be covered by sediment or scale. Therefore if the valve is opened whereby the seal 118 of the valve member 116 is withdrawn from engagement with the valve seat 117 (as shown at FIGS. 7 and 8), to the retracted position as shown in FIGS. 5 and 6, there will be a restricted flow or no fluid flow from the drain outlet. In order to provide a full flow from the opened valve, the clearing element is moved axially from a retracted position at which the cap member 129 is accommodated adjacent the inner end of the valve member 116 to an extended position at which it extends into the volume of the vat (as shown at FIG. 8) to penetrate the layer of scale or sediment which has collected within the region of the drain hole in order to clear such scale or sediment away from the drain hole prior to the opening of the valve. The clearing element may then be withdrawn into engagement with the inner end of the valve member 116 (as shown at FIG. 7) and then the valve member 116 can be withdrawn from engagement with the valve seat 117 (as shown at FIG. 5).

The movement of the valve member 116 between its sealing engagement with the valve seat and its retracted position as shown in the drawing can be effected by application of fluid pressure to the first and second spaces 141 and 142 within the chamber 19 provided in the hydraulic cylinder while the movement of the clearing element between its retracted position and its extended position can be effected by application of fluid pressure to the third and fourth spaces 146 and 147 within the valve member 116. If desired the movement of the clearing element between the retracted position and the extended position may be effected when the valve member 116 is in both its retracted and extended position by application of pressure into the fourth space 147 and venting of the third space 16. Similarly the clearing element can be moved from the extended position and the retracted position by the application of fluid pressure to the third space 146 and venting the fourth space while the valve member 116 is in its retracted or extended position.

The cap member 129 on the one end of the clearing element is provided at its outer end with a piercing tip 133 which is formed of a wear resistant material and which is configured to enhance penetration by the cap member of any deposit collecting in the region above the drain hole.

In addition the cap member has a diameter corresponding to that of the valve seat 117 or a little less then the valve seat 117. This ensures that the clearing member clears any deposits from the valve seat 117 when it is caused to be moved to and from the extended position whilst the valve is in the open or retracted position as shown at FIGS. 5 and 6.

The valve of the second embodiment provides a means of ensuring that the region upstream of the valve is clear prior to the valve being opened and of ensuring that the region upstream of the valve remains clear during the period that the valve is open. In addition the valve member when retracted away from the valve seat ensures a clear passageway between the inlet 111 and the outlet 114 and as a result any detritus or pieces of sediment which are dislodged as a result of the action of the cutting tip will pass through the hollow body without causing an obstruction. Furthermore the configuration of the valve member is such that it is substantially cylindrical and as a result when it is intermediate of the retracted and extended position it is not possible for detritus or pieces of sediment that are dislodged by the action of the cutting tip to become jammed between the wall of the hollow body and the valve member and which will prevent the complete retraction of the valve member. In addition whilst the valve is open the clearing element can be moved to its extended position in order to ensure that any deposits which may collect on the valve seat 117 can be removed and to clear any blockages which may develop within the inlet 111.

If desired the valve may be associated with a control means which will periodically activate the delivery of fluid to the fourth and third spaces 147 and 146 respectively to cause the clearing element to be cyclically moved from the retracted position to the extended position and then to the retracted position to maintain the region above the valve member and drain clear of sediment. This cyclic action may be effected manually or automatically.

The second embodiment also provides a means whereby it is possible to visually determine the state of the valve by observing the degree of extension of the valve member 116 from the body and the degree of extension of the rod 128 from the valve member 116. In addition a suitable locking means in the form of a locking ring 152 is provided on the first end cap 123 to lock the valve member 116 in an open or closed position as desired. The locking ring 152 is supported from the first end cap and is adapted to be rotatable on the second end cap and around the body of the valve member 116 whereby as a result of such rotation in one direction or the other the locking can lock the valve member in position or enable it to be moved.

According to another embodiment of the invention which is a variation which can be used with either of the first and second embodiments described above, the clearing element may be mounted such that on its axial movement from the retracted position to the extended position, it is caused to undergo rotation to facilitate its penetration through any deposit in the region of the drain outlet.

It should be appreciated that the scope of the present invention need not be limited to the particular scope of the embodiments described above. In particular, the movement of the valve member and the clearing element may be effected by any suitable means and need not be limited to the hydraulic drive described in relation to the embodiment. Furthermore, the valve according to the invention need not be limited to utilisation with drain outlets but may also have application to valves located in flow lines or in any suitable application for valves.

The claims defining the invention are as follows:

1. A valve comprising a body adapted to be associated with an opening in the wall of a fluid reservoir or flowline, to provide a flow path, from an inlet at said opening, to an outlet, a valve seat located across the flow path at the inlet, a valve member movably supported from the body to be movable between a closed position at which it is in sealing engagement with the valve seat and an open position at which it is spaced from the valve seat, an elongate clearing element for clearing scale or sediment in the region of the opening, the clearing element being slidably supported within the valve member for axial movement within the valve member, the clearing element having an outer end which is movable towards and away from the valve member between an extended position at which it extends from the valve member through the valve seat beyond the opening and a retracted position closely adjacent the valve member, the valve member further including a first drive means, which includes at least one of a seal and a piston, being received in a cylindrical first chamber which is concentric to the valve member, the first drive means defining two spaces within the chamber and the spaces being capable of receiving pressurized fluid for acting on the drive means to effect said movement of the valve member, the elongate clearing element including a second drive means that includes at least one of a piston and a seal, and wherein the valve includes at least a third space for receiving pressurized fluid for acting on the second drive means for effecting said axial movement of the clearing element.

2. A valve as claimed at claim 1 wherein the valve member is provided with a first seal at one end which is proximate the valve seat wherein the first seal is in engagement with the valve seat when the valve member is at its closed position to sealingly close the valve, and wherein the first drive means includes a second seal located at the other end of the valve member.

3. A valve as claimed at claim 1 wherein the second drive means is received in the chamber and separates the second and third spaces.

4. A valve as claimed at claim 1 wherein the first drive means includes a seal located intermediate the length of the valve member.

5. A valve as claimed at claim 1 wherein one end of the valve member extends beyond the chamber.

6. A valve as claimed at claim 1 wherein the valve member is hollow and a second chamber is defined within the valve member around a portion of the clearing element received therein and wherein the second drive means include a seal provided with the portion of the clearing element and received in the second chamber to subdivide the second chamber into two spaces, one of the two spaces including the third space, and the other of the two spaces being a fourth space capable of being pressurized to effect said movement of the clearing element.

* * * * *